United States Patent Office 2,965,569
Patented Dec. 20, 1960

2,965,569

LUBRICATING OIL ADDITIVES AND PREPARATION THEREOF

Albert R. Sabol, Munster, Ind., assignor to Standard Oil Company, Chicago, Ill., a corporation of Indiana No Drawing. Filed Nov. 30, 1955, Ser. No. 550,196

9 Claims. (Cl. 252—32.7)

This invention relates to lubricating oil additives and their method of preparation.

It has heretofore been found that neutralized reaction products of a phosphorus sulfide and a hydrocarbon when added to a hydrocarbon oil are effective in inhibiting the formation of varnish, sludge, carbon and the like in lubricating oils during their use. Recently it has been found that such additives should have a high degree of basicity in order to neutralize acidic compounds formed by oxidation of the sulfur and other components of the fuel and lubricant and in order to continue functioning effectively as detergents over a longer period of time. It is well known that increasing the metal content, and hence the basicity, of an additive of the type described will effectively increase the ability of the oil to neutralize acids formed during the combustion cycle. The most economical way of increasing the metal content is to increase the metal to phosphorus ratio of the additive rather than to increase the total amount of additive in the oil in order to obtain the desired level of the basic metal. However, when the metal to phosphorus ratio of the additive is increased, serious problems arise in the manufacture of the additive. A very difficult problem of filtering solid materials from the final additive composition occurs. The solution of the additive, usually in an oil, becomes exceedingly viscous and frequently gelation occurs making it virtually impossible to conduct the filtration. Because it is imperative that the solids be filtered from the additive composition, a method of preventing and/or reducing the viscosity increase and gelation tendencies of the additive during its manufacture is essential.

An object of this invention is to provide a lubricating oil additive and a method for its manufacture. Another object is to provide a lubricating oil additive having detergent and dispersant properties and a high basic metal to phosphorus ratio providing it with a high basicity. A further object is to provide a method for preparing a detergent additive having excess basicity and hence neutralizing ability whereby a substantially clear additive composition, readily filterable, and having a high metal to phosphorus ratio is obtained. Other objects and advantages of the present invention will become apparent as the description of the invention proceeds.

It has been discovered that a lubricating oil additive having the aforementioned properies can be prepared by reacting a normally liquid hydrocarbon such as a butylene polymer having a molecular weight between about 150 and 50,000, with phosphorus sulfide and then hydrolyzing the resultant reaction products. Inorganic phosphorus acids formed during the hydrolysis are removed by contacting with an adsorbent such as clay. The adsorbent-treated product is then neutralized with between about 4 and 15 parts by weight of a basic alkaline earth metal compound such as barium oxide in the presence of an aliphatic alcohol which has between 1 and 3 carbon atoms, inclusive. The neutralization is preferably carried out in the presence of alcohol plus water. The neutralization products are then heated and alcohol vaporized therefrom. At this stage of the manufacture the viscosity of the neutralization products increases and gelation may occur, especially if only a minor amount or no water is added during the neutralization step. Formic acid is added at this point in an amount between about 0.1 and 50% by weight, based on the neutralization products from which alcohol has been vaporized. This reduces the viscosity or breaks the gel which may have formed or which may form upon heating the formic acid containing mixture to a temperature between about 200° and 500° F. at which it is filtered to remove solids.

The phosphorus sulfide-hydrocarbon reaction product which may be employed is the reaction product of any of a variety of phosphorus-sulfur compounds with any of a variety of hydrocarbons. The preferred hydrocarbon used for reaction with the phosphorus sulfide is a mono-olefin hydrocarbon polymer resulting from the polymerization of low molecular weight mono-olefin hydrocarbons, such as propylene, butylenes, amylenes or copolymers thereof. Such polymers may be obtained by the polymerization of mono-olefins of less than 6 carbon atoms in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and isomono-olefin polymers having molecular weights ranging from about 150 to about 50,000 or more, and preferably from about 500 to about 10,000. Such polymers can be obtained, for example, by the polymerization in the liquid phase of a hydrocarbon mixture containing mono- and isomono-olefins, such as butylene and isobutylene at a temperature of from about —80° F. to about 100° F. in the presence of a metal halide catalyst of the Friedel-Crafts type, such as for example, boron fluoride, aluminum chloride, and the like. In the preparation of these polymers, a hydrocarbon mixture containing isobutylene, butylenes and butanes recovered from petroleum gases, especially those gases produced in the cracking of petroleum oils in the manufacture of gasoline can be used.

Paraffinic hydrocarbons such as bright stock residuums, lubricating oil distillates, waxes, and the like can be reacted with phosphorus sulfide. Olefins having 16 to 30 carbon atoms or higher may be reacted with the phosphorus sulfide. Other hydrocarbons that can be reacted with a phosphorus sulfide are aromatic hydrocarbons such as benzene, naphthalene, diphenyl, alkylated aromatic hydrocarbons such as benzene having alkyl substituents containing preferably at least 8 carbon atoms, and the like.

The phosphorus sulfide-hydrocarbon reaction product can be readily obtained by reacting a phosphorus sulfide, for example $P_2S_5$ with the hydrocarbon at a temperature of from about 200° F. to about 600° F., and preferably from about 300° F. to about 500° F., using from about 1% to about 50%, and preferably from about 5% to about 25% of the phosphorus sulfide in the reaction. The reaction is carried out for about 1 to 70, preferably 5, hours. It is advantageous to maintain a non-oxidizing atmosphere, such as for example, an atmosphere of nitrogen above the reaction mixture. Usually, it is preferable to use an amount of the phosphorus sulfide that will completely react with the hydrocarbon; however, an excess amount of phosphorus sulfide can be used and will be separated from the product during filtration.

The phosphorus sulfide-hydrocarbon reaction product obtained is then hydrolyzed. This is usually carried out at a temperature of between about 200° F. and 600° F., preferably at a temperature between about 300° F. and 500° F. No novelty is claimed in the method of hydrolyzing the phosphorus sulfide-hydrocarbon reaction product, and any of the usual techniques may be used. A suitable method for conducting the hydrolysis consists of introducing steam through the reaction mass at temperatures in the range of those indicated supra.

During hydrolysis undesirable inorganic acids of phosphorus as well as low molecular weight organic compounds containing phosphorus are formed. If these compounds are allowed to remain in the hydrolysis products, the finished additive may cause an undesirable amount of engine wear and engine deposits, as well as having a poorer degree of detergency. These undesirable impurities are removed by contact of the hydrolysis products with an adsorbent. The adsorbent contacting may remove between about 1 and 15% of the hydrolysis products. Generally between 1 and 15%, usually between 5 and 10%, of the phosphorus present in the hydrolysis products may be removed during the adsorbent contacting step. It is preferred to remove a major proportion of the inorganic acids of phosphorus, and usually between about 70 and 80% of these acids are removed. A substantial portion of the organic phosphorus compounds removed during the adsorption step are low molecular weight organic acids of phosphorus. In removing these undesirable compounds, the neutralization products may be contacted with any of a wide variety of adsorbent materials. Examples of suitable adsorbents are those such as Attapulgus Clay, Floridin, Filter Cel, fuller's earth, bentonite, magnesite, bauxite, and other similar diatomaceous earth materials. The contacting may be carried out with from about 1 to about 30% of the adsorbent material at a temperature of from about 100 to about 500° F., usually from about 250 to 400° F., until a sample of the contacted material indicates the removal of a major proportion of the inorganic phosphorus acids. The adsorbent may be agitated with the hydrolysis products for a period of from about 0.5 to 20 hours. After contacting for the desired length of time the mixture is then filtered, for example by means of a filter press, to remove adsorbent. The method of removing the inorganic acids of phosphorus by contacting with an adsorbent is detailed fully in U.S. 2,688,612 to R. W. Watson.

The adsorbent-treated product is then neutralized with a basic alkaline earth metal compound. Barium hydroxide, and preferably barium oxide, may be employed, although the carbonates, sulfides or other basic compounds of alkaline earth metals such as calcium may be used. The lubricating oil additives which are produced in accordance with my process are those which have "excess basicity" or are known as having "an alkaline reserve." The term "excess basicity" will be used herein to describe such additives which contain the metal constituent in excess of the amount stoichiometrically necessary to replace the acidic hydrogen atoms contained in the hydrolyzed phosphorus sulfide-hydrocarbon reaction product. In order to produce a product which has excess basicity it is necessary to use between about 4 and 15 parts by weight of the basic alkaline earth metal compound per part by weight of the phosphorus present in the adsorbent-treated product. By employing such large amounts it is possible to produce additives containing weight ratios of barium to phosphorus of 8:1 or thereabouts.

Prior to carrying out the neutralization the adsorbent-treated product is preferably diluted with a normally liquid hydrocarbon, generally the same as, or similar to the hydrocarbon oil, in which the finished additive is to be employed. The adsorbent-treated product is usually diluted to a phosphorus content of from about 0.5 to about 5% or more. Advantageously the basic alkaline earth metal compound such as barium oxide may be slurried in the oil and added to the adsorbent-treated product. A low molecular weight aliphatic alcohol having between 1 and 3 carbon atoms, inclusive per molecule, is then added to the slurry of the basic alkaline earth metal compound and phosphorus sulfide-hydrocarbon reaction product diluted with oil. The manner in which the ingredients are added one to the other is of no important consequence. The alcohol may be one such as methyl, ethyl, n-propyl, or iso-propyl. Methyl alcohol is preferred. Generally between about 2 and 20 moles of alcohol per mole of the basic alkaline earth metal compound may be used, although the preferred range is between about 5 and 10 moles of alcohol per mole of basic alkaline earth metal compound. The presence of water during the neutralization step (water introduced as hydroxide or hydrate of alkaline earth metal compound is included in this discussion) is desirable since it tends to reduce the increase in viscosity and/or gelation tendencies of the additive which occur just prior to filtering. Thus the use of small amounts of water also may reduce the amount of formic acid which is needed to obtain easy filtration. If a surplus of water is used, the neutralized product may not be clear and bright and high ratios of metal to phosphorus are not constantly obtainable. Usually from 0.1 to 2, preferably about 1, moles of water per mole of basic alkaline earth metal compound may be used.

The ingredients are mixed (mixing is employed almost continually throughout the manufacture of the additive except in certain obviously impracticable steps such as filtering through filter presses) and the neutralization is carried out by heating usually at a temperature between about 100° F. and the reflux temperature of the mixture. It is preferred to carry out the neutralization under refluxing conditions for about 1 to about 5 hours, the refluxing temperature varying with the alcohol employed and the presence or absence of water. With methanol the refluxing temperature may be about 160° F. Neutralization in the presence of alcohol and water to produce a compound having excess basicity is further described in S.N. 541,037, now U.S. Patent No. 2,838,484.

After the neutralization has been effected, the neutralized mixture is heated to vaporize alcohol therefrom. It is preferred to remove a major portion of the alcohol and preferably substantially all of it. Any water may also be removed. This may conveniently be carried out by increasing the temperature of the mixture and permitting alcohol vapors to pass out through the reflux condenser. If methyl alcohol is employed as the alcohol, the mixture may be heated to about 180° F. to drive off the methyl alcohol. Formic acid is then added to the remaining neutralization products in an amount between about 0.1 and 50%, preferably between about 5 and 10%, by weight based upon the remaining neutralization products (exclusive of diluting oil). The formic acid reduces the viscosity of the mixture, and breaks the gel if one is present. Other acids such as acetic acid and high molecular weight organic acids peculiarly will not produce the same effect. In addition higher molecular weight organic acids reduce the detergency properties of the finished additive.

The neutralization products containing formic acid are then heated for at least about 5 to 10 minutes preferably at a temperature of approximately 200° F. or higher. It is preferred to reflux the mixture containing formic acid for at least about 5 minutes. The reaction with formic acid is preferably carried out for a time not longer than about 5 hours or thereabouts. Thereafter, the mixture containing formic acid is heated to a temperature between about 200° and 500° F. at which temperature it is filtered. The heating of the mixture containing formic acid to the operating temperature for filtration may be carried out over a period of time, for example from 2 to 3 hours, and this time interval may serve as the reaction period between the neutralized product and the formic acid. Excess formic acid as well as other low boiling components may be vaporized from the substance while heating to the filtration temperature. If no formic acid is added to the neutralization products, the latter remain viscous even when heated to the elevated temperatures used in the filtration step. By means of the formic acid used in my invention it is possible to obtain a non-viscous and readily filterable material at the elevated temperatures used in filtering.

After heating the formic acid-neutralization products mixture for the proper length of time, and thereafter removing any low boiling vapors from the heated mixture, the remaining liquid mixture is then filtered. In the filtering operation solid materials which would be harmful in the finished additive are removed. Examples of such solid materials are those such as excess alkaline earth metal compound neutralizing agent, and other insoluble compounds. For example the mixture which is about to be filtered may contain barium oxide, barium sulfide, barium formate, or the like. While the filtration may be carried out at temperatures between 200° and 500° F., a temperature of about 300 to 350° F. is preferred. Any of the conventional filter presses may be used. It is preferable to add a filtration aid such as Filter Cel. Vacuum filter presses are highly satisfactory.

The filtrate which is obtained will consist of the finished lubricating oil additive diluted with whatever oil had been added during the neutralization step. It may be used as such for addition to the oil or may be distilled and concentrated. It may be employed in the lubricating oil in an amount between about 0.01 and 20% by weight. The lubricating oil in which it is employed may be a mineral lubricating oil or a synthetic oil such as of the alkylene oxide type, the polyester type or the like.

The following embodiment is illustrative of the herein described invention and is not to be indicative of the scope thereof.

Butylene polymer having a molecular weight of about 850 was reacted with 15% $P_2S_5$ at a temperature of about 450° F. for about 5 hours. The product was then hydrolyzed with steam at a temperature of 300° F. for 5 hours (until the acidity of the product remained substantially constant with continued steaming). The hydrolyzed product was then diluted with SAE 5W oil (40% oil—60% hydrolyzed reaction product). The diluted hydrolyzed product was then contacted with Attapulgus Clay Fines for about 2 hours at a temperature of approximately 300° F. The clay fines were then removed by filtering. The adsorbent-treated product had a phosphorus content of about 2.2%. Approximately 1000 grams of the adsorbent-treated product was charged to a reactor together with 1000 grams of SAE 5W oil (additional diluent), 195 grams of barium oxide (7 parts by weight of barium per part by weight of phosphorus in the adsorbent-treated product), 600 ccs. of methyl alcohol (6–7 moles of methyl alcohol/mole of barium oxide), and 18 ccs. of water (0.8 mole of water/mole of barium oxide). The mixture was refluxed for 3 hours at 160° F. The condenser was removed and the contents heated to 180° F. whereupon substantially all of the methyl alcohol was removed. 20 grams of formic acid (4% based upon undiluted neutralization products) were then added and the mixture heated to 300° F. over a period of time of 2½ to 3 hours. The mixture was filtered at 300–340° F. in a vacuum filter to remove solids therefrom. The filtrate, which was the lubricating oil additive diluted with about 3 parts of an SAE 5W oil, was bright and clear and had a barium content of 6.52% by weight and a phosphorus content of 1.02% by weight.

Thus having described my invention what is claimed is:

1. A method for preparing a lubricating oil additive which comprises reacting a normally liquid hydrocarbon with between about 1.0% and 50% of a phosphorus sulfide at a temperature between about 200° and 600° F.; hydrolyzing the resultant phosphorus sulfide-hydrocarbon reaction products whereby inorganic acids of phosphorus are formed; contacting the hydrolysis products with an adsorbent whereby inorganic phosphorus acids are adsorbed on said adsorbent; separating adsorbent from the adsorbent-treated product; neutralizing the adsorbent-treated product with from about 4 to about 15 parts by weight of a basic alkaline earth metal compound per part by weight of the phosphorus present in the adsorbent-treated product, the neutralization being carried out in the presence of a diluent mineral lubricating oil and at least about 2 moles of an aliphatic alcohol per mole of basic alkaline earth metal compound, said alcohol having between one and 3 carbon atoms inclusive, per molecule; heating the oil-diluted neutralization products and vaporizing alcohol therefrom; thereafter admixing formic acid with the oil diluted neutralization products from which alcohol has been vaporized, the formic acid being added in an amount between about 1 and 50% by weight based on undiluted neutralization products from which alcohol has been vaporized; heating the resultant formic acid-containing mixture to a temperature between about 200° and 500° F. and filtering to remove solids therefrom.

2. The method of claim 1 wherein the phosphorus sulfide-liquid hydrocarbon reaction product is the reaction product of a phosphorus sulfide and a butylene polymer having a molecular weight of between about 150 and 50,000.

3. The method of claim 1 wherein the basic alkaline earth metal compound is a basic barium compound.

4. The method of claim 1 wherein the basic alkaline earth metal compound is barium oxide.

5. The method of claim 1 wherein the neutralization is carried out in the presence of between about 0.1 and 2 moles of water per mole of the basic alkaline earth metal compound and between about 2 and 20 moles of methyl alcohol per mole of the basic alkaline earth metal compound.

6. The method of claim 1 wherein the neutralization is carried out under refluxing conditions.

7. The method of claim 1 wherein substantially all of the alcohol is removed from the neutralization products by vaporization therefrom.

8. The method of claim 1 wherein formic acid is refluxed with the neutralization products from which alcohol has been vaporized.

9. A method for preparing a lubricating oil additive which comprises reacting a butylene polymer having a molecular weight of between about 500 and 10,000 with between about 1.0% and 50% of a phosphorus sulfide at a temperature between about 200° F. and 600° F., hydrolyzing the resultant phosphorus sulfide-hydrocarbon reaction product whereby inorganic acids of phosphorus are formed; diluting the hydrolyzed product with a mineral lubricating oil, contacting the diluted hydrolysis products with an adsorbent clay at a temperature between about 100° and 500° F. for a time sufficient to remove a major proportion of the inorganic acids of phosphorus; separating the adsorbent from the oil-diluted adsorbent-treated product; neutralizing the oil-diluted adsorbent-treated product with from about 4 to about 15 parts by weight of a barium oxide per part by weight of phosphorus present in the adsorbent-treated product, said neutralization being carried out in the presence of between about 0.1 and 2 moles of water per mole of the barium oxide and between about 2 and 20 moles of methyl alcohol per mole of the barium oxide, the neutralization being carried out under refluxing conditions; heating the oil-diluted neutralization products and vaporizing substantially all of the alcohol therefrom; adding formic acid to the oil-diluted neutralization products from which methanol has been vaporized, the formic acid being added in an amount between about 0.1 and 50% by weight based on undiluted neutralization products from which methanol has been vaporized; heating the formic acid containing mixture to a temperature between about 200° and 500° F.; removing vapors from the oil-diluted formic acid reaction products and filtering to remove solids therefrom, and recovering filtrate which comprises the oil-diluted lubricating oil additive.

References Cited in the file of this patent
UNITED STATES PATENTS

| | | |
|---|---|---|
| 2,316,091 | White | Apr. 6, 1943 |
| 2,546,552 | Loane et al. | Mar. 27, 1951 |
| 2,647,889 | Watson et al. | Aug. 4, 1953 |
| 2,688,612 | Watson | Sept. 7, 1954 |
| 2,726,208 | Karll et al. | Dec. 6, 1955 |
| 2,767,209 | Asseff et al. | Oct. 16, 1956 |
| 2,841,552 | Richardson et al. | July 1, 1958 |